(12) United States Patent
Bieber et al.

(10) Patent No.: US 12,273,475 B2
(45) Date of Patent: Apr. 8, 2025

(54) CASE FOR A MOBILE TELEPHONE

(71) Applicant: HRBeauty LLC, Beverley Hills, CA (US)

(72) Inventors: Hailey Rhode Bieber, Beverley Hills, CA (US); Helen Steed, Beverley Hills, CA (US); Sam Sonntag, Beverley Hills, CA (US)

(73) Assignee: HRBeauty, LLC, Beverly Hills, CA (US)

( * ) Notice: Subject to any disclaimer, the term of this patent is extended or adjusted under 35 U.S.C. 154(b) by 0 days.

(21) Appl. No.: 18/639,243

(22) Filed: Apr. 18, 2024

(65) Prior Publication Data
US 2024/0267446 A1 Aug. 8, 2024

Related U.S. Application Data

(63) Continuation-in-part of application No. 29/928,571, filed on Feb. 13, 2024.

(51) Int. Cl.
*H04M 1/02* (2006.01)

(52) U.S. Cl.
CPC ......... *H04M 1/0249* (2013.01); *H04M 1/026* (2013.01)

(58) Field of Classification Search
CPC ...... H04M 1/0249; H04M 1/026; H04M 1/04; A45C 11/00; A45C 2011/002; A45C 13/002; A45F 5/00; A45F 5/02; A45F 5/021; A45F 2005/008; A45F 2200/0516; A45F 2200/0508; G06F 1/163; G06F 1/166; H05K 5/03
See application file for complete search history.

(56) References Cited

U.S. PATENT DOCUMENTS

| | | | |
|---|---|---|---|
| 4,141,119 A * | 2/1979 | Nodo | A41F 3/02 24/504 |
| 9,800,703 B2 * | 10/2017 | Roux | H04B 1/3888 |
| 9,843,657 B1 * | 12/2017 | Guzek | H04M 1/0202 |
| 9,876,524 B1 * | 1/2018 | Motilall | G06F 1/1626 |
| 9,929,766 B1 * | 3/2018 | Guzek | H04B 1/3888 |
| 11,102,341 B1 | 8/2021 | Kutsko et al. | |
| 2007/0293288 A1 * | 12/2007 | Lin | H04M 1/04 455/575.8 |
| 2010/0259144 A1 * | 10/2010 | Bevirt | F16M 11/16 312/223.1 |
| 2010/0270345 A1 * | 10/2010 | Kecskes | A45F 5/021 224/269 |
| 2011/0309117 A1 * | 12/2011 | Roberts | H04M 1/04 224/217 |
| 2012/0168323 A1 * | 7/2012 | Schmidt | F16M 11/10 206/45.24 |
| 2013/0032617 A1 * | 2/2013 | Adelman | G06F 1/163 224/191 |
| 2013/0180296 A1 * | 7/2013 | McEachern | E05B 65/08 292/300 |

(Continued)

*Primary Examiner* — Jinsong Hu
*Assistant Examiner* — Rui M Hu
(74) *Attorney, Agent, or Firm* — Steptoe & Johnson, PLLC

(57) ABSTRACT

Apparatus comprising a body having an inner surface and an outer surface opposite the inner surface, the inner surface being arranged to be placed adjacent an object, the outer surface including first and second retaining elements extending outwardly therefrom and defining a retaining groove therebetween.

15 Claims, 4 Drawing Sheets

(56) References Cited

U.S. PATENT DOCUMENTS

| | | | | |
|---|---|---|---|---|
| 2013/0299365 A1* | 11/2013 | Andrew | ............... | A45F 5/00 |
| | | | | 206/37 |
| 2014/0228082 A1* | 8/2014 | Morrow | ............ | H04B 1/3888 |
| | | | | 455/575.8 |
| 2014/0262854 A1* | 9/2014 | Chen | ................. | F16M 11/10 |
| | | | | 206/45.24 |
| 2015/0148103 A1* | 5/2015 | Samsilova | ...... | H04M 1/724092 |
| | | | | 439/39 |
| 2015/0215439 A1* | 7/2015 | Stanimirovic | ........ | H04M 1/185 |
| | | | | 455/572 |
| 2015/0227167 A1* | 8/2015 | Chiang | ............. | H04M 1/0202 |
| | | | | 362/616 |
| 2015/0257501 A1* | 9/2015 | Webber | ............... | G06F 1/1628 |
| | | | | 224/197 |
| 2016/0007704 A1* | 1/2016 | Liebers | ............... | A45C 11/00 |
| | | | | 206/38 |
| 2016/0316872 A1* | 11/2016 | Huang | ............... | H04B 1/3888 |
| 2017/0119118 A1* | 5/2017 | Williams | ............... | A45F 5/00 |
| 2017/0146890 A1* | 5/2017 | Shoemake | ........... | G06F 1/1632 |
| 2017/0347773 A1* | 12/2017 | Seidler | ............... | A61M 35/003 |
| 2018/0338601 A1* | 11/2018 | Ziemann | ............... | A45D 40/18 |
| 2019/0190287 A1* | 6/2019 | Vail | ................ | H02J 7/0044 |
| 2019/0280727 A1* | 9/2019 | Gehlhausen | ........ | F16M 11/041 |
| 2020/0336580 A1* | 10/2020 | Lee | ................ | H04M 1/04 |
| 2020/0367632 A1* | 11/2020 | Friedman | ............... | A45F 5/021 |
| 2021/0084132 A1* | 3/2021 | Chou | ............... | G06F 1/1681 |
| 2022/0151354 A1* | 5/2022 | Soderstrom | ..... | H04M 1/724092 |
| 2023/0362288 A1* | 11/2023 | Cai | ................ | F16M 11/125 |
| 2024/0039572 A1* | 2/2024 | Yoder | ............... | H04B 1/385 |
| 2024/0094784 A1* | 3/2024 | Do | ................ | G06F 1/1681 |

\* cited by examiner

CASE FOR A MOBILE TELEPHONE

CROSS-REFERENCE TO RELATED APPLICATION

This application is based on and claims priority to U.S. patent application Ser. No. 29/928,571 filed Feb. 13, 2024 entitled "CASE FOR A MOBILE TELEPHONE".

SUMMARY OF THE INVENTION

The present invention relates to apparatus including retaining means, and in particular to a portable electronic device including the retaining means.

Portable electronic devices such as mobile telephone devices are often protected by a case which includes a shell to surround at least the sides and rear face of the mobile telephone.

According to one aspect of the present invention, there is provided apparatus comprising a body having an inner surface and an outer surface opposite the inner surface, the inner surface being arranged to be placed adjacent an object, the outer surface including first and second retaining elements extending outwardly therefrom and defining a retaining groove therebetween.

According to a second aspect of the present invention, there is provided a method comprising fitting to an object a body having an inner surface and an outer surface opposite the inner surface, the inner surface being arranged to be placed adjacent the object and inserting an item into a retaining groove between first and second retaining elements extending outwardly from the outer surface.

According to a third aspect of the present invention, there is provided apparatus comprising a mobile telephone case having an inner surface and an outer surface opposite the inner surface, the inner surface being arranged to be placed adjacent a mobile telephone, the outer surface including integral first and second retaining elements extending outwardly therefrom and defining a retaining groove therebetween.

Owing to these aspects, it is possible to hold a relatively small personal item in the retaining groove.

Preferably, the first and second retaining elements are integral with the body which is, advantageously in the form of a mobile telephone protective case, the mobile telephone device being the object to be placed in the protective case. However the body could also be a planar item simply detachably connected in any suitable manner to the object.

Preferably the first and second retaining elements are wall portions and, advantageously, they converge towards each other toward one end. Furthermore, there is preferably a joining wall section at the end towards which the first and second retaining elements converge and defining a substantially U-shaped or substantially V-shaped retaining groove. The shape of the retaining groove advantageously substantially mimics, in two or three dimensions, the shape of the item to be retained therein.

In addition, the material from which the first and second retaining elements are made is preferably a flexible material to be able to adapt to the shape and/or dimensions of an item to be retained therebetween

DETAILED DESCRIPTION OF THE INVENTION

Figure 1:
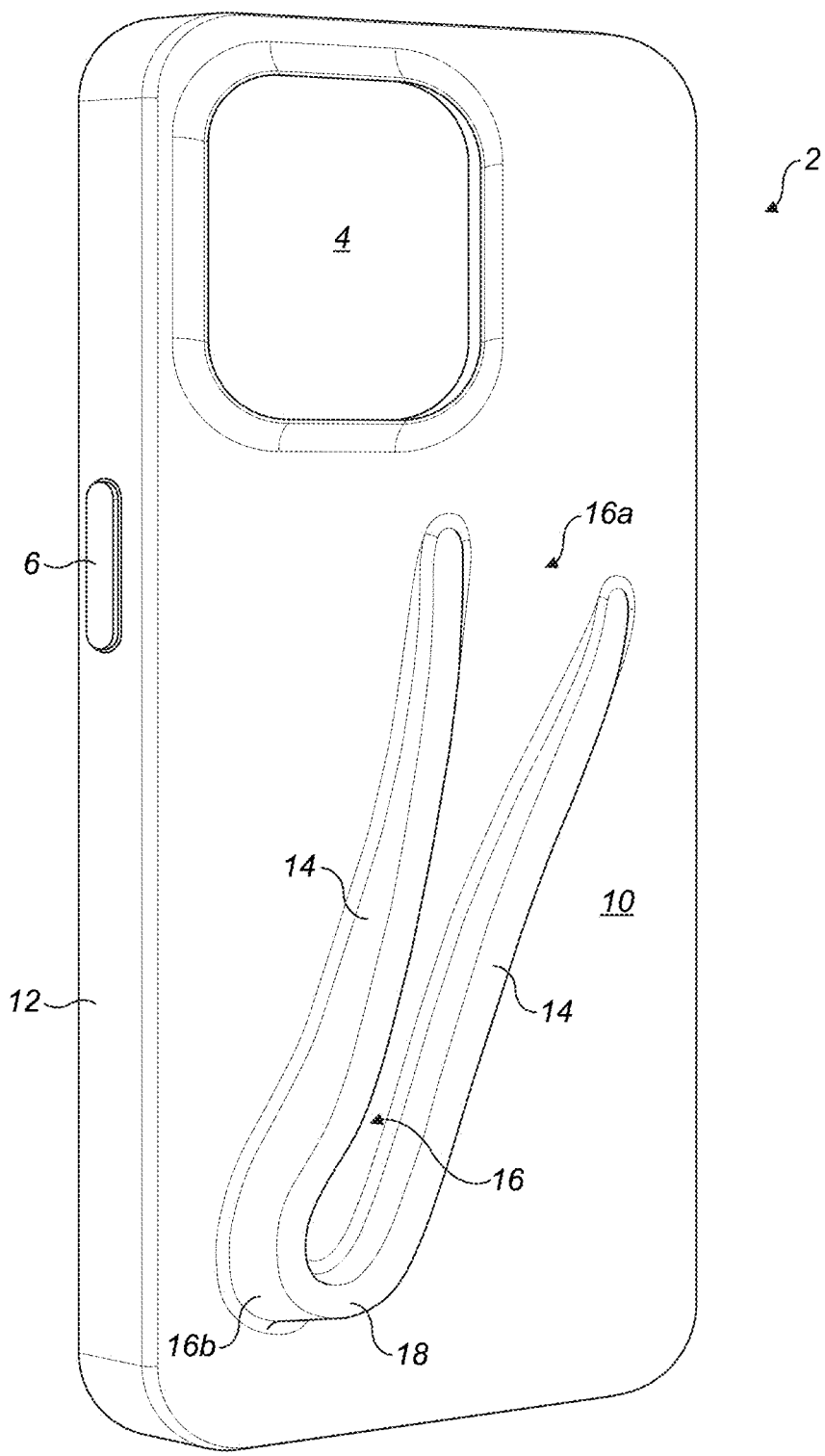
FIG. 1 is a rear perspective view of a first embodiment of a mobile telephone case including a retaining groove between first and second retaining elements.

Prior to proceeding with the more detailed description of the present invention it should be noted that, for the sake of clarity, identical components which have identical functions have been designated by identical reference numerals throughout the several views illustrated in the drawings.

Referring to FIG. 1, a first embodiment of a protective case 2 for a mobile telephone (not shown) forms a shell body to surround at least the sides and rear face of the mobile phone and includes known features to enable a user to operate the mobile telephone whilst the case its fitted to the phone, such as an opening 4 for a camera of the phone and a further opening or covering 6 to facilitate operation of buttons on the phone. The case further comprises an inner surface 8 (see FIG. 2), an outer surface 10 opposite the inner surface 8 and side, top and bottom wall portions 12 which extend away from the outer surface 10 serving to receive the mobile telephone in the case 2. When the case 2 is fitted to the mobile phone, a rear face of the mobile phone lies closely adjacent the inner surface 8 and the lateral edges of the mobile telephone are covered by the side, top and bottom wall portions 12. The outer surface 10 includes first and second retaining elements 14 which define a retaining groove 16 therebetween and extend outwardly from the outer surface 10. The retaining groove 16 is uncovered serving to readily receive a personal item of a user of the case 2 which is not related to the operation or use of the mobile telephone, such as a personal care product like a container of a substance the user may apply to themselves frequently through a day, such as, a tube of lip gloss. The embodiment of FIG. 1 shows a substantially U-shaped or substantially V-shaped retaining groove 16 with an open end 16a and a closed end 16b closed by a joining wall section 18 joining the first and second retaining elements 14. The first and second retaining elements 14 are wall portions gradually increasing in height from the outer surface 10 from the open end 16a toward the closed end 16b, reaching a maximum height H between half and two thirds of the distance between the open end 16a and the closed end 16b (see FIG. 3). The first and second retaining elements 14 may also converge, along their whole length or only part thereof, towards each other toward the closed end 16b. The shape of the retaining groove 16 advantageously substantially mimics, in two or three dimensions, the shape of the item to be retained therein. In this way, the item to be inserted into the retaining groove 16 is closely received and retained by the surrounding first and second retaining elements 14 and joining wall section 18 to be held securely therein but preferably with an end part of the item projecting beyond the open end 16a where the height of the retaining elements 14 is lowest. This arrangement allows the item retained in the retaining groove 16 to be readily removed from the retaining groove 16 for use.

The first and second retaining elements 14 are shown as integral with the case 2, but they could be mounted on a planar body to be detachably mounted, in any suitable manner, for example with an adhesive or magnetically, to the rear face of the mobile telephone or even to an existing mobile telephone case.

Figure 2:
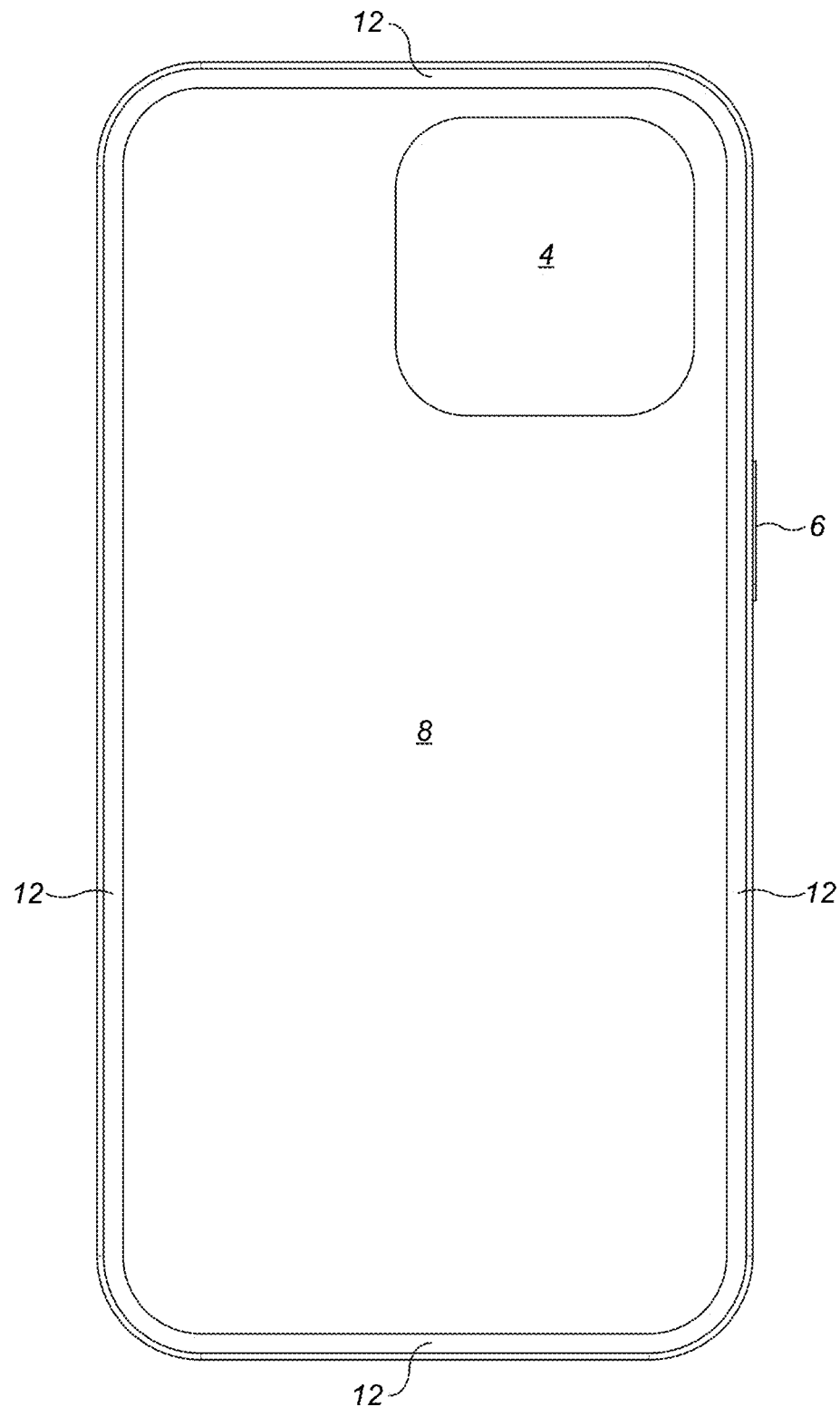
FIG. 2 is a front view of the mobile telephone case of FIG. 1.
Figure 3:
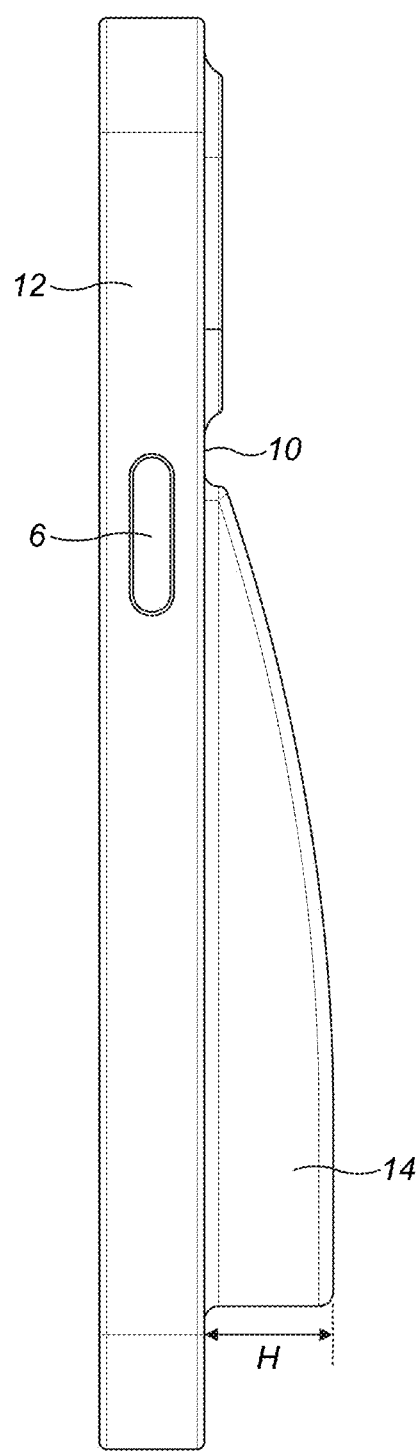
FIG. 3 is a side view of the mobile telephone case of FIG. 1.
Figure 4:
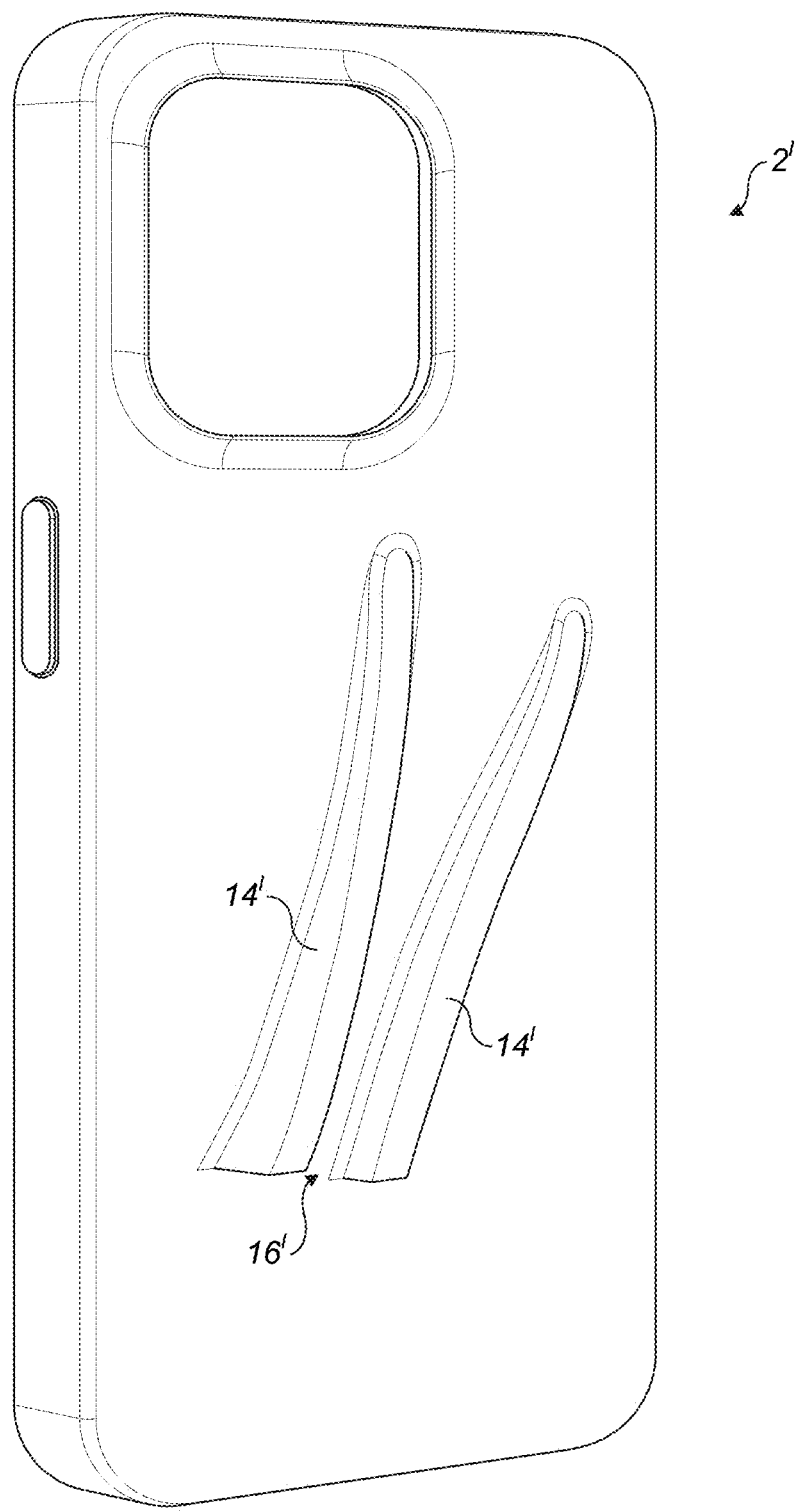
FIG. 4 is a perspective view similar to FIG. 1, but of a second embodiment of the mobile telephone case.

Referring to FIG. 2, a second embodiment of the mobile telephone case 2' includes the same features as the embodiment of FIG. 1, in which the retaining groove 16', defined by the first and second retaining elements 14', is open at both ends as there is no joining wall section 18. This arrangement potentially allows for the insertion of a wider range of different items.

While presently preferred embodiments of the present invention have been described in detail above, it should be understood that various other adaptations and/or modifications of the invention can be made by those persons who are particularly skilled in the art without departing from either the spirit of the invention or the scope of the appended claims.

What is claimed is:

1. Apparatus comprising a body having an inner surface and an outer surface opposite the inner surface, the inner surface being arranged adjacent to a mobile electronic device, the outer surface including first and second retaining elements extending outwardly therefrom and defining a retaining groove therebetween, wherein the first and second retaining elements are made of a flexible material that is adaptable to the shape and dimensions of an item to be retained therebetween and wherein the first and second retaining elements gradually increase in height away from the outer surface from one end of the retaining groove toward an opposite end, the first and second retaining elements converging toward each other, along their whole length or only part thereof, from the one end to the opposite end, wherein the item is unrelated to the operation of the mobile electronic device, wherein the retaining groove is open at the one end, and wherein the first and second retaining elements are longest along axes parallel to the outer surface.

2. Apparatus according to claim 1, wherein the first and second retaining elements are integral with the body.

3. Apparatus according to claim 2, wherein the body is a mobile telephone protective case.

4. Apparatus according to claim 1, wherein the retaining groove is uncovered.

5. Apparatus according to claim 1, wherein the body is a planar item detachably connected to the mobile electronic device.

6. Apparatus according to claim 1, wherein the first and second retaining elements are wall portions.

7. Apparatus according to claim 1, wherein the retaining groove includes a closed end opposite the one end and closed by a joining wall section joining the first and second retaining elements.

8. Apparatus according to claim 1, wherein the first and second retaining elements define a substantially U-shaped or substantially V-shaped retaining groove.

9. Apparatus according to claim 1, wherein a shape of the retaining groove substantially mimics the shape of an item to be retained therein.

10. Apparatus according to claim 1, wherein the retaining groove is configured to contact the item only partially along a length of the item.

11. Apparatus according to claim 1, wherein the retaining groove is configured to contact the item only partially along a length of the item and wherein the item to be retained is arranged to project beyond the one end.

12. A method comprising fitting to a mobile electronic device a body having an inner surface and an outer surface opposite the inner surface, the inner surface being arranged to be placed adjacent the mobile electronic device and inserting an item unrelated to the operation of the mobile electronic device into a retaining groove between first and second retaining elements extending outwardly from the outer surface, wherein the first and second retaining elements are made of a flexible material that is adaptable to the shape and dimensions of the item to be retained therebetween, wherein the first and second retaining elements gradually increase in height away from the outer surface from one end of the retaining groove toward an opposite end, the first and second retaining elements converging toward each other, along their whole length or only part thereof, from the one end to the opposite end, and wherein the retaining groove is open at the one end, an end region of the item configured to project beyond the retaining groove open end where the height of the retaining elements is lowest, the arrangement allowing the item retained in the retaining groove to be readily removed from the retaining groove for use, and wherein the first and second retaining elements are longest along axes parallel to the outer surface.

13. Apparatus comprising a mobile telephone case having an inner surface and an outer surface opposite the inner surface, the inner surface being arranged adjacent to a mobile telephone, the outer surface including integral first and second retaining elements extending outwardly therefrom and defining a retaining groove therebetween, wherein the first and second retaining elements are made of a flexible material that is adaptable to the shape and dimensions of an item to be retained therebetween, wherein the first and second retaining elements gradually increase in height away from the outer surface from one end of the retaining groove toward an opposite end, the first and second retaining elements converging toward each other, along their whole length or only part thereof, from the one end to the opposite end, wherein the item is unrelated to the operation of the mobile telephone, wherein the retaining groove is open at the one end, and wherein the first and second retaining elements are longest along axes parallel to the outer surface.

14. Apparatus according to claim 13, wherein the retaining groove is configured to contact the item only partially along a length of the item.

15. Apparatus according to claim 13, wherein the retaining groove is configured to contact the item only partially along a length of the item and wherein the item to be retained is arranged to project beyond the one end.

* * * * *